(12) United States Patent
Wiegel et al.

(10) Patent No.: US 7,281,752 B2
(45) Date of Patent: Oct. 16, 2007

(54) PORTABLE VEHICLE AND/OR EQUIPMENT STORM SHIELD

(76) Inventors: J. Parr Wiegel, 972 Aldermnan Rd., Palmyra, NY (US) 14522; Anthony Sigillito, 217 Pleasant Hill Rd., Flanders, NJ (US) 07836

( * ) Notice: Subject to any disclaimer, the term of this patent is extended or adjusted under 35 U.S.C. 154(b) by 177 days.

(21) Appl. No.: 10/803,376

(22) Filed: Mar. 18, 2004

(65) Prior Publication Data
US 2005/0206188 A1    Sep. 22, 2005

(51) Int. Cl.
*B60J 11/00* (2006.01)
(52) U.S. Cl. ........................................... 296/98
(58) Field of Classification Search ............ 296/98; 160/24, 121.1, 122, 290.1, 370.22, 154, 166, 160/167
See application file for complete search history.

(56) References Cited

U.S. PATENT DOCUMENTS

| | | | | |
|---|---|---|---|---|
| 3,021,894 A | * | 2/1962 | La Due ...................... 160/23.1 |
| 3,949,527 A | * | 4/1976 | Double et al. .................... 52/4 |
| 4,727,898 A | * | 3/1988 | Guma ........................... 135/87 |
| 5,176,421 A | * | 1/1993 | Fasiska .................. 296/136.03 |
| 5,740,826 A | * | 4/1998 | Nevin et al. ............. 135/88.06 |
| 5,746,237 A | * | 5/1998 | Arnic ....................... 135/88.06 |
| 6,276,381 B1 | * | 8/2001 | O'Brien ........................ 135/87 |
| 6,672,643 B1 | * | 1/2004 | Brodskiy et al. ............. 296/98 |
| 6,682,123 B2 | * | 1/2004 | Burks et al. .................. 296/98 |
| 6,705,664 B1 | * | 3/2004 | Lahutsky ............... 296/136.12 |

FOREIGN PATENT DOCUMENTS

| | | | | |
|---|---|---|---|---|
| DE | 3242200 | * | 5/1984 | .................. 296/98 |
| DE | 3245017 | * | 6/1984 | .................. 296/98 |
| DE | 3520448 | * | 12/1986 | .................. 296/98 |
| FR | 2585299 | * | 1/1987 | .................. 296/98 |
| FR | 2705065 | * | 11/1994 | .................. 150/166 |
| GB | 2177359 | * | 1/1987 | .................. 296/98 |
| JP | 401101224 | * | 4/1989 | .................. 296/98 |

* cited by examiner

*Primary Examiner*—H Gutman
(74) *Attorney, Agent, or Firm*—Harter Secrest & Emery LLP; Jodi A. Reynolds, Esq.; Brian B. Shaw, Esq.

(57) ABSTRACT

A vehicle and/or equipment storm shield is provided as having a spool of membrane material, which may be relatively quickly un-spooled to provide a sheet of membrane material operative to substantially enclose the vehicle and/or equipment for protecting the vehicle and/or equipment from wind, rain and/or flying debris associated with storming conditions. In a similar manner, the vehicle and/or equipment storm shield may also be adapted to protect computers, generators, communications equipment and the like, from damage due to storming weather conditions.

12 Claims, 5 Drawing Sheets

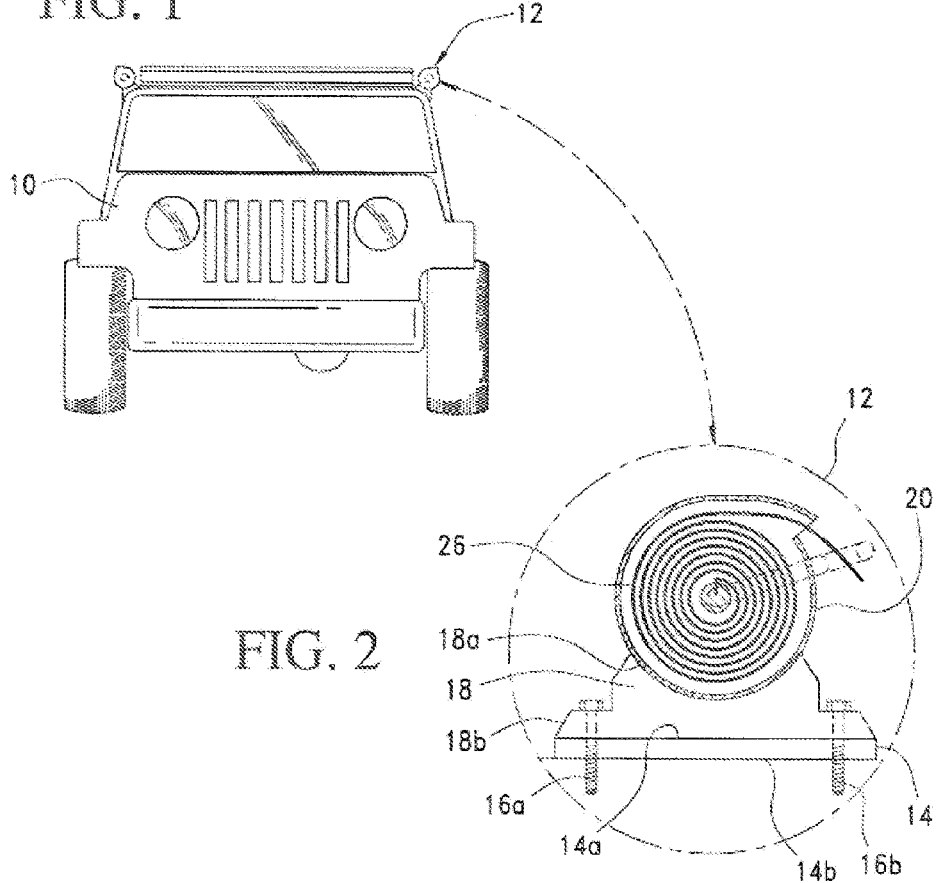
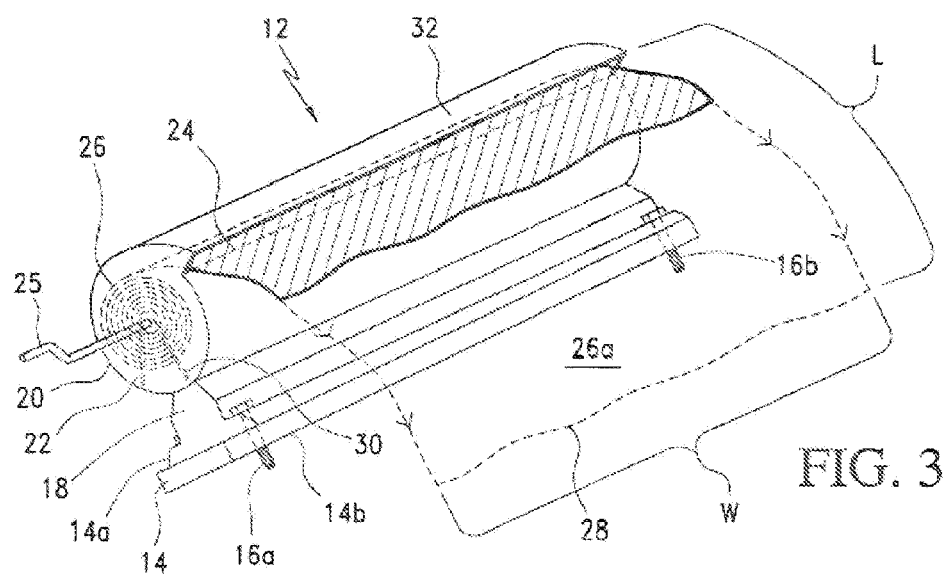

PORTABLE VEHICLE AND/OR EQUIPMENT STORM SHIELD

FIELD OF THE INVENTION

This invention relates to a portable vehicle and/or equipment storm shield and more particularly to a portable vehicle and/or equipment storm shield that permits users to substantially enclose the vehicle and/or equipment for minimizing any damage thereto from flying sand or debris associated with storming conditions.

BACKGROUND OF THE INVENTION

As is known, there is an increasing trend to deploy military planes, helicopters, trucks and/or equipment (collectively referred to as "equipment") to desert terrain areas of the world. These desert terrain areas commonly have relatively violent wind and sand storms, which typically occur with little or no warning. These wind and sand storms typically produce flying sand swirls and/or other flying debris, which can damage equipment. In particular, the flying sand and/or other debris has a tendency to stick to various machinery and other moving parts of the equipment causing equipment failure or severely reducing the life expectancy of the equipment.

One solution for protecting equipment from storming conditions is to park or otherwise store the equipment in storage hangers, bunkers or warehouses prior to the occurrence of storms. However, as described above, these storms typically occur with little or no warning and due to the relative geographic location of the equipment with respect to the hangers, bunkers or warehouses, it may not be possible to store the equipment in the hangers, bunkers or warehouses before any storm strikes.

It would, therefore, be desirable to provide a storm protective device that overcomes the aforesaid and other disadvantages.

SUMMARY OF THE INVENTION

The present invention provides a vehicle and/or equipment incorporating the storm shield with a highly portable and efficient structure which may be relatively quickly deployed to substantially enclose the vehicle and/or equipment for protecting the vehicle and/or equipment from wind, rain and/or flying debris associated with storming conditions. While the vehicle and/or equipment storm shield is primarily shown and described in conjunction with a vehicle and a helicopter, it should be understood that the vehicle and/or equipment storm shield may be incorporated into a number of other vehicles or equipment, including but not limited to generators, HVAC units, computers, satellites, radar systems, maintenance equipment, and the like, as will become apparent below.

In an aspect of the present invention, the equipment storm shield includes an elongated base having a top surface and a bottom surface adapted for coupling to the equipment. An elongated spool support member is mounted on the top surface of the base and includes a top surface having an elongated concave surface. An elongated spool housing is mounted on the concave surface of the spool support member and includes an elongated hollow interior portion accessible via an elongated opening. The elongated opening extends along a longitudinal edge region of the spool housing. A first spool of flexible membrane material is rotatably mounted in the hollow interior portion of the spool housing and includes a first longitudinal edge (e.g., leading edge) substantially aligned with the opening located on the spool housing. The first longitudinal edge of the first spool of flexible membrane material may be pulled through the opening to remove a first predetermined sheet portion of membrane material from the first spool of flexible membrane material. This first predetermined sheet portion of material is constructed and arranged as a barrier for protecting the equipment against predetermined storm conditions.

In another aspect of the present invention, set forth is an equipment storm shield system. The equipment storm shield system includes an equipment pad area adapted to provide a parking area for the equipment (e.g., helicopter). The equipment storm shield system further includes a plurality of anchor devices, which are located along a first portion of a perimeter of the pad area. An elongated spool of flexible membrane material rotatably mounted in a spool housing is mounted on a second portion of the perimeter of the pad area. An elongated opening located on the spool housing is adapted to permit a first longitudinal edge (i.e., leading edge) of the spool of flexible membrane material to be pulled through the opening to remove a first predetermined sheet portion of membrane material from the spool of flexible membrane material. In operation, the first predetermined sheet portion of membrane material is pulled over the equipment parked on the pad area and is retained in position using one or more of the plurality of anchoring devices for permitting the first predetermined sheet portion of membrane material to serve as a barrier from storming conditions and for protecting the equipment against damage.

BRIEF DESCRIPTION OF THE DRAWINGS

The foregoing features of this invention, as well as the invention itself, may be more fully understood from the following description of the drawings in which:

FIG. 1 shows a vehicle incorporating an equipment storm shield of the present invention;

FIG. 2 is a cross-sectional view of the equipment storm shield of FIG. 1;

FIG. 3 is an isometric view of the equipment storm shield of FIG. 1;

DETAILED DESCRIPTION OF THE INVENTION

Figure 4:
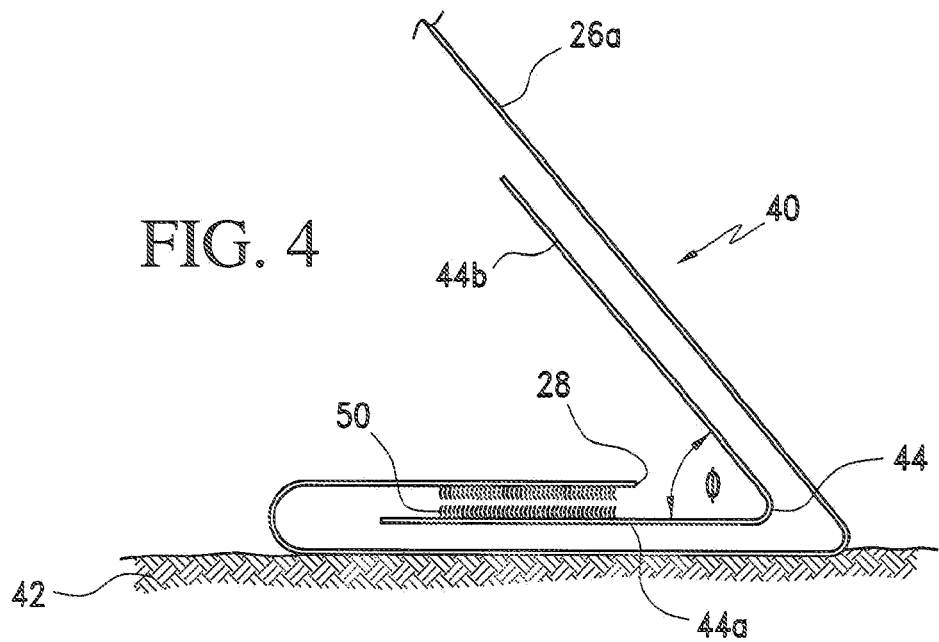
FIG. 4 is a side view of an anchoring device employed on the equipment storm shield of FIG. 1.

Referring to FIG. 1, shown is one embodiment of a vehicle 10 incorporating an equipment storm shield 12 in accordance with principles of the present invention. With this arrangement, an operator can deploy the equipment storm shield 12 to substantially enclose the vehicle 10 for minimizing any damage to the vehicle from storming conditions, such as rain, wind, snow, sleet, flying debris (e.g., sand), which will be described below is further detail.

Referring to FIGS. 2 and 3 collectively, shown is one embodiment of the equipment storm shield 12, which for exemplary purposes can be mounted on the vehicle 10, as shown in FIG. 1. The equipment storm shield 12 includes an elongated base 14 having a top surface 14a and a bottom surface 14b. The base 14 may be formed of a number of relatively soft and compliant materials, such as rubber, plastic and/or polymer composite materials, all of which are suitable for permitting the bottom surface 14b of the base 14 to be securely attached to the vehicle 10. The bottom surface 14b of the base 14 may be attached to the vehicle 10 using various fastening mechanisms, such as screws 16a, 16b and/or adhesives (not shown).

The equipment storm shield 12 further includes an elongated spool support member 18 having a top surface 18a and a bottom surface 18b. The bottom surface 18b of spool support member 18 is substantially aligned and mounted on the top surface 14a of the base 14. The top surface 18a of the spool support member 18 includes an elongated concave surface, which is shaped to accept and securely support an elongated spool housing 20. The spool housing 20 includes a hollow interior portion 22, which is accessible via an elongated opening 24 that extends along a longitudinal edge region of the spool housing 20.

A spool of flexible membrane material 26 is rotatably mounted in the hollow interior portion 22 of the spool housing 20. The spool of flexible membrane material 26 includes a first longitudinal edge 28, which is substantially aligned with the opening 24 located on the spool housing 20. In this arrangement, an operator may pull the first longitudinal edge of the spool of flexible membrane material 26 through the opening 24 for removing a first predetermined sheet portion of material 26a from the spool of flexible membrane material 26, which includes a length and width respectively represented in FIG. 3 by the terms, "L" and "W".

In an exemplary embodiment, the spool housing 20 includes a spring loaded tension mechanism 30 adapted to provide a predetermined spring force to the spool of flexible membrane material 26, which is rotatably mounted in the spool housing 20, to permit the spool of flexible membrane material 26 to retract the first predetermined sheet portion of material 26a after use. In the event that the spring loaded tension mechanism 30 fails or in lieu of the spring loaded tension mechanism, the spool housing may be provided with a manual hand cranking mechanism 25. The manual hand cranking mechanism 25 may be coupled to the spool of flexible membrane material 26 so that manual rotation of the hand cranking mechanism 25 is transposed to the spool of flexible membrane material 26, which may also permit the spool of flexible membrane material 26 to retract the first predetermined sheet portion 26a of material after use.

In addition, the spool housing 20 may include a pivotably mounted access door 32 that operates to seal the opening 24 located on the spool housing 20 when the equipment storm shield 12 is not in use. The access door 32 may be retained in a closed position using a retaining mechanism (not shown), such as a spring or a latch.

The spool of flexible membrane material 26, which is mounted in the spool housing 20, may include a plurality of natural and/or synthetic fabrics, cloths and materials that are constructed to be breathable, or not, depending on the intended application of the equipment storm shield 12. For example, although not specifically shown, if the equipment storm shield 12 is intended to be mounted on equipment, such as a generator, uninterruptible power supply desktop computer systems or other equipment that may require the expulsion of heat and or other vapors from time to time, the spool of flexible membrane material may be constructed of a breathable material. Similarly, if the equipment storm shield 12 is intended to be mounted on equipment that may house people, which require oxygen to breathe, the spool of flexible membrane material 26 may also be constructed of a breathable material. In an exemplary embodiment, the spool of flexible membrane material may include a plurality of breathable materials including, but limited to: cloth, canvas, and/or other airpermeable but water-impermeable materials such as that sold b W. L. Gore & Associates, Inc. under the trademark GORE-TEX. In addition, the spool of flexible membrane material may include Natural or synthetic materials, Knitted or woven materials, which can be coated, chemically treated or laminated with predetermined materials to control air permeability and/or water repellency.

On the other hand, if the equipment storm shield 12 is intended to be mounted on equipment that does not require ventilation, such as a helicopter or other aircraft, as will be described in further detail below in connection with other embodiments of the present invention, the flexible membrane material 26 may be constructed of a non-breathable material. In an exemplary embodiment, the spool of flexible membrane material 26 may include a plurality of non-breathable materials including, but limited to: nylon, plastics and polymers. In addition, the spool of flexible membrane material may include Natural or synthetic materials, Knitted or woven materials, which can be coated, chemically treated or laminated with predetermined materials to control air permeability and/or water repellency.

Figure 5:
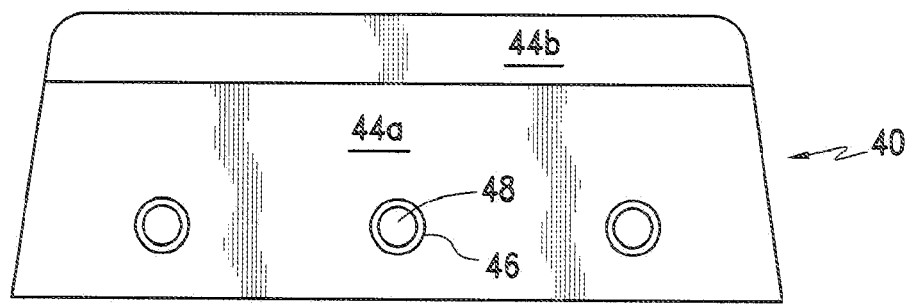
FIG. 5 is a top view of the anchoring device of FIG. 4.

Referring to FIGS. 4 and 5 collectively, shown is a side view and a top view, respectively, of an anchoring mechanism 40 incorporated on the equipment storm shield 12 of the present invention. The anchoring mechanism 40, as described below in detail, is adapted for retaining or otherwise anchoring the first longitudinal edge 28 of the spool of flexible membrane material 26 on a ground surface 42 located a predetermined horizontal distance from the equipment for which the equipment storm shield 12 is mounted on. In an embodiment, the anchoring mechanism 40 includes an angle bracket 44 having a base 44a portion and a support portion 44b. The base portion 44a includes a plurality of openings 46 that are each dimensioned to accept an anchor spike 48 or anchor sand screw (not shown) therethrough. Each anchor spike 48 is operative to securely retain the base portion 44a of the angle bracket 44 in a predetermined position of the ground surface 42. In the exemplary embodiment, the base portion 44a of the angle bracket 44 includes three opening which are each adapted for accepting one of three anchor spikes. It should be understood, however, that additional openings 46 (e.g., two, three or more) or fewer openings 46 (e.g., a single opening) and associated anchor spike(s) 48 may be employed to retain the angle bracket 44 in the predetermined position.

The base portion 44a of the angle bracket 44 may further include a releasable attachment mechanism 50 adapted to engage and securely retain the first longitudinal edge 28 of the spool of flexible membrane material 26. In an embodiment, the releasable attachment mechanism 50 may include at least one of, but not limited to: hook and loop fasteners such as that sold under the trademark Velcro and snaps. It should be understood that the releasable attachment mechanism 50, as provided above, is provided for exemplary purposes and that there is a plurality of other releasable attachment mechanisms not specifically described herein that may be used in conjunction with the base portion 44a of the angle bracket 44 for retaining the first longitudinal edge 28 of the spool of flexible membrane material 26 in the predetermined position on the ground surface 42.

The support portion 44b of the angle bracket 44 is adapted to support a segment of the first predetermined portion 26a of the flexible membrane material 26 at a predetermined angle from the base portion 44a of the angle bracket 40. The predetermined angle for which the support portion 44b of the angle bracket 44 supports the first predetermined portion 26a of the flexible membrane material 26 is represented by the angle Ø in FIG. 4, which is formed between the base portion 44a and the support portion 44b of the angle bracket 44. The angle of Ø may be adjusted for providing a corresponding adjustment to the angle for which the support portion 44b of the angle bracket 44 supports the first predetermined portion 26a of the flexible membrane material 26. For example, during relatively strong winds associated with storming conditions, it may be desirable to decrease the angle Ø formed between the base portion 44a and support portion 44b of the angle bracket 44 and to relatively increase the longitudinal horizontal distance defined between the angle bracket 44 and the vehicle 10 and/or equipment which carries the equipment storm shield 12. In this arrangement, the relatively strong winds associated with the storming conditions may be more gradually deflected from the vehicle 10 and/or equipment which carries the storm shield 12 and also reduce the likelihood of angle bracket 44 failure resulting in the collapse of the first predetermined portion of the flexible membrane material 26a.

In another example, during relatively light winds associated with storming conditions, it may be desirable to increase the angle Ø formed between the base portion 44a and support portion 44b of the angle bracket 44 and to relatively decrease the longitudinal horizontal distance defined between the angle bracket 44 and the vehicle 10 and/or equipment which carries the equipment storm shield 12. In this arrangement, the relatively light winds associated with the storming conditions may be more quickly deflected from the vehicle 10 and/or equipment which carries the storm shield 12, while at the same time minimizing the overall foot-print or space occupied by the first predetermined portion 26a of the flexible membrane material 26. In an embodiment, the angle Ø formed between the base and support portions 44a, 44b of the angle bracket 40 range from approximately 15-degrees to approximately 75-degrees.

Although the anchoring mechanism 40 has been shown and described hereinabove with reference to an angle bracket 44, it should be understood that a number of other anchoring mechanisms not specifically shown herein may also be employed to retain the first predetermined sheet portion 26a of the flexible membrane 26 on the ground surface 42 at a predetermined horizontal distance from the equipment which carries the vehicle and/or equipment storm shield 12 of the present invention. For example, the anchoring mechanism 40 may include an anchoring system that is permanently mounted in a trench, as disclosed in commonly owned U.S. Pat. No. 6,088,975, entitled, Hurricane Protection for Mobile Homes and Small Buildings, which is hereby incorporated by reference in its entirety.

Figure 6:
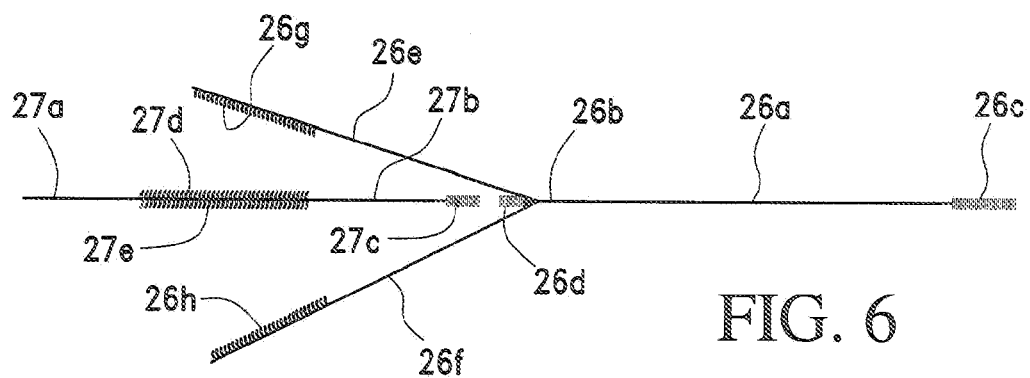
FIG. 6 shows the coupling of flexible membrane material associated with equipment storm shield of FIG. 1 with flexible membrane material associated with another similarly constructed equipment storm shield.

Referring now to FIG. 6, shown is a frontal edge view of the first predetermined sheet portion of material 26a, which is extracted or otherwise pulled from the spool of flexible membrane material 26, as represented in FIG. 3. In FIG. 6, the first predetermined sheet portion of material 26a includes a first adjacent edge 26b adapted for coupling to a second adjacent edge 27b of a second predetermined sheet portion of material 27a, which is extracted or otherwise pulled from a second spool of flexible membrane material (not shown). Although the second spool of flexible membrane material is not specifically shown, it should be understood that the second spool of flexible membrane material is similarly constructed and arranged as the first spool of flexible membrane material 26 (e.g., as shown in FIG. 3).

In the exemplary embodiment, the first adjacent edge 26b of the first predetermined sheet portion of material 26a, which is associated with the first spool of membrane material 26, includes a first zipper portion 26d, an upper flap 26e and a lower flap 26f. The first zipper portion 26d is adapted to engage a second zipper portion 27c located on the second adjacent edge 27b of the second predetermined sheet portion of material 27a, which is associated with the second spool of membrane material. The upper flap 26e and the lower flap 26f each include hook and loop fastener portions 26g, 26h that are constructed and arranged to engage hook and loop fastener portions 27d, 27e located on the second adjacent edge 27b of the second predetermined sheet portion of material 27a. In this arrangement, the first and second predetermined sheet portions of material 26a, 27a, respectively associated with the first 26 and second (not shown) spools of membrane material may be coupled together.

Figure 7:
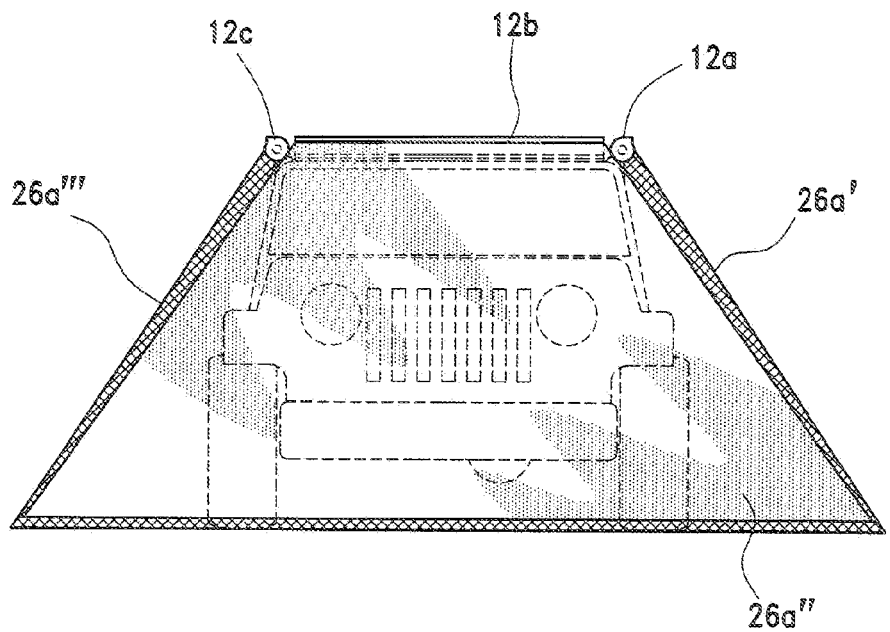
FIGS. 7 and 8 respectively show front and side views of four equipment storm shields mounted on a roof-top of a vehicle and which are deployed to substantially enclose the vehicle for protecting the vehicle from storming conditions.
Figure 8:
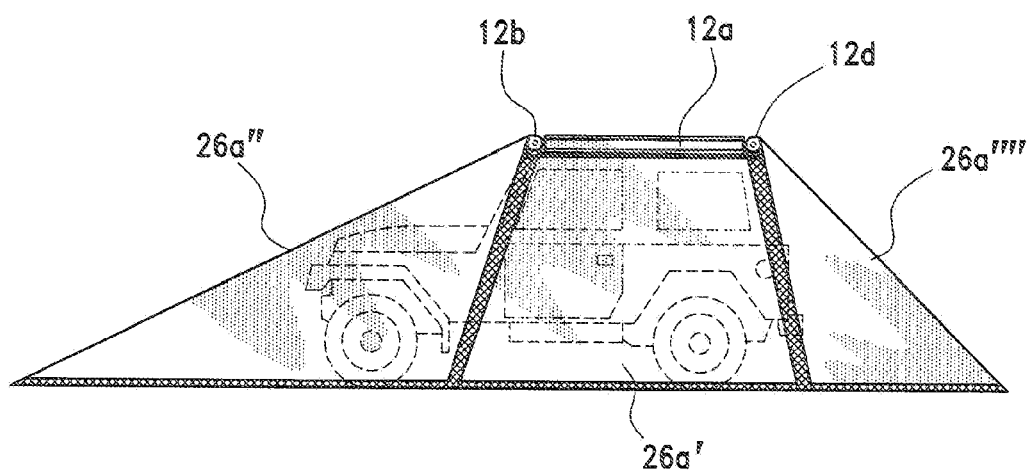

Referring to FIGS. 7 and 8, in the exemplary embodiment, first, second, third and fourth vehicle and/or equipment storm shields 12a, 12b, 12c, 12d are each mounted along one edge of a roof-top of the vehicle 10. It should be understood that each of the first, second, third and fourth vehicle and/or equipment storm shields 12a, 12b, 12c, 12d are similarly constructed and (arranged as the vehicle and/or equipment storm shield 12, as shown and described above in conjunction with FIGS. 1-6. In this arrangement, the first, second, third and fourth vehicle and/or equipment storm shields 12a, 12b, 12c, 12d may be deployed to respectively provide first, second, third and fourth sheet membrane portions 26a', 26a'', 26a''', 26a'''', which are each anchored to the ground surface a predetermined horizontal distance from the vehicle 10 using the anchoring mechanism 40, as described above. In addition, the first, second, third and fourth sheet membrane portions 26a', 26a'', 26a''', 26a'''' are coupled together, as also described above (e.g. see FIG. 6), to substantially enclose the vehicle 10 for protecting the vehicle 10 from wind, snow, rain and/or flying debris (e.g., sand) during storming conditions.

Figure 9:
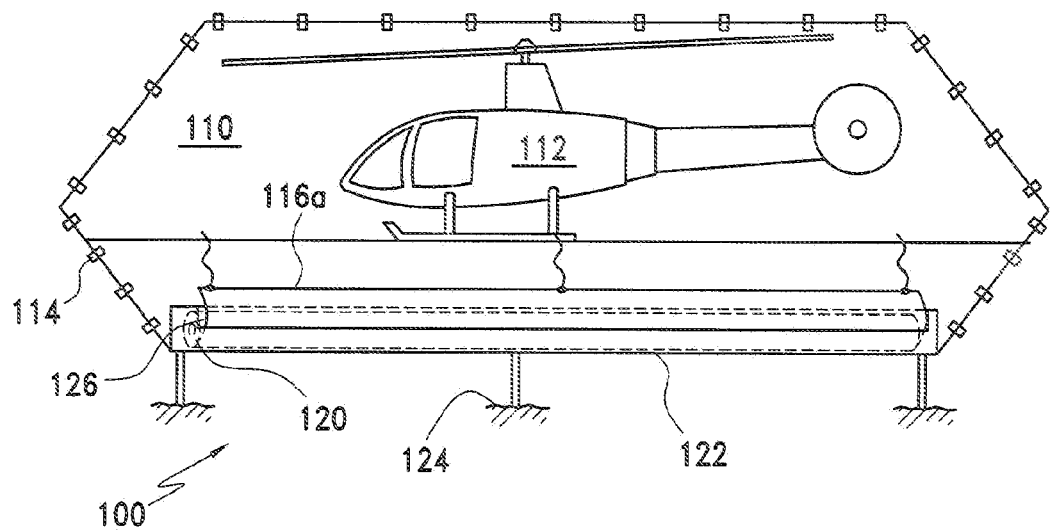
FIGS. 9 and 10 respectively show a frontal and rear view of an equipment storm shield system in accordance with another embodiment of the present invention.
Figure 10:
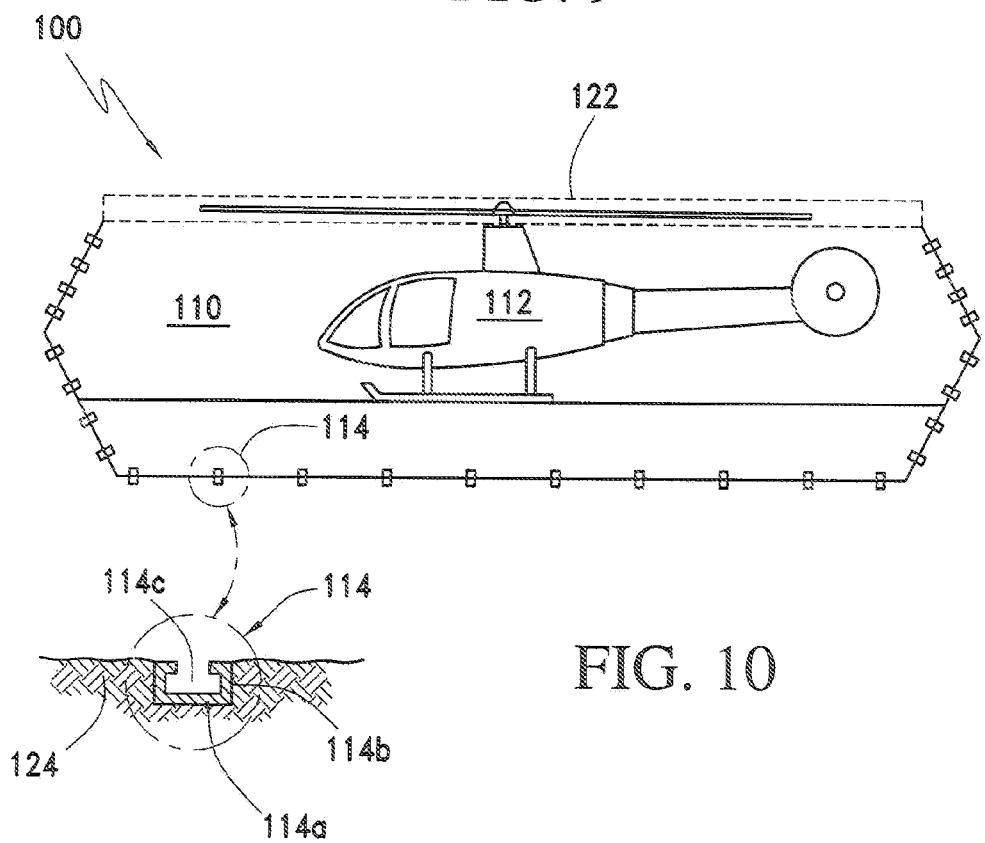

Referring now to FIGS. 9 and 10, respectively shown is a frontal view and a rear view of an equipment storm shield system 100 in accordance with another exemplary embodiment of the present invention. The equipment storm shield system 100 includes an equipment pad area 110 which is adapted to provide parking for the equipment. In an embodiment, the equipment pad area 110 may be formed of a concrete or asphalt slab that is dimensioned and marked to permit a helicopter, vehicle and/or plane, as well as a plurality of other devices and/or equipment, such as mobile or stationary computer systems, generators and/or power supplies (hereinafter collectively referred to as "equipment 112") to be parked or otherwise positioned in a predetermined location on the pad area 110.

The equipment storm shield system 100 further includes a plurality of anchoring devices 114, which are located along a first portion of a perimeter of the pad area 110. In an embodiment, each of the anchoring devices 114 includes a metal frame member 114a that is permanently mounted in a trench 114b. The metal frame member 114a is constructed and arranged to form an opening 114c, which is adapted to accept a corresponding engagement member 114d (FIG. 11) that is attached to a leading edge region 116a of the first predetermined sheet portion of membrane material 118a (as well to a leading edge region 116b of a second predetermined sheet portion of membrane material 118b), as will be described in further detail below in connection with FIG. 11.

As shown in FIGS. 9 and 10, the equipment storm shield system 100 further includes an elongated spool of flexible membrane material 120 rotatably mounted in a spool housing 122. The spool housing 122 may be mounted on a ground surface 124 in a location defined by a second portion of the perimeter of the pad area 110. In this arrangement, the first portion of the perimeter of the pad area 110 including the anchoring devices 114 and the second portion of the perimeter of the pad area 110 including the spool housing 122 operate to substantially encircle the pad area 110. An elongated opening 126 located on the spool housing 122 permits the leading edge region 116a of the spool of flexible membrane material 120 to be pulled through the opening 126 to remove the first predetermined sheet portion of membrane material 118a from the spool of flexible membrane material 120.

Figure 11:
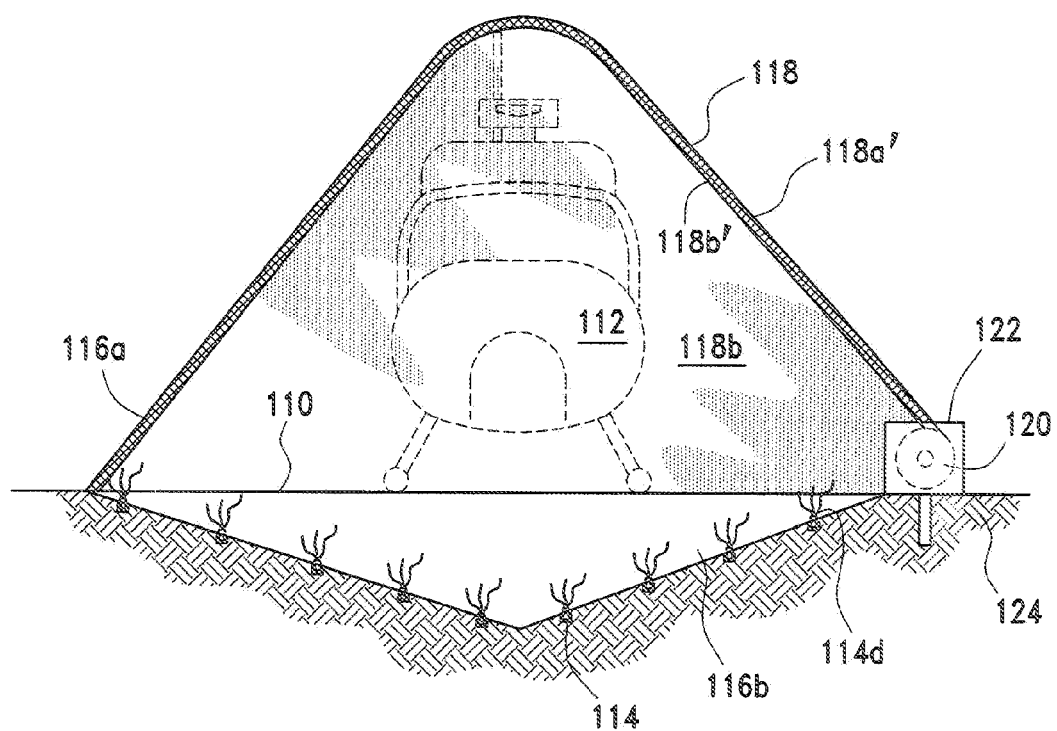
FIG. 11 shows the equipment storm shield of FIGS. 9 and 10, which is deployed to substantially enclose a helicopter for protecting the helicopter from storming conditions.

Referring further to FIG. 11, during use, the first predetermined sheet portion of membrane material 118a is pulled over the equipment 112 parked on the pad area 110 and is retained in position using one or more of the plurality of anchor devices 114. More particularly and as briefly mentioned above, after the first predetermined sheet portion of membrane material 118a is pulled over the equipment 112 parked on the pad area 110, one or more of a number of engagement members 114d, which are each uniformly spaced and attached to the leading edge region 116a of the first predetermined sheet portion of membrane material 118a (as well as to the leading edge region 116b of the second predetermined sheet portion of membrane material 118b), are engaged to a corresponding anchoring devices 114d located on the ground surface 124. Thereafter, the spool of membrane material 120 contained in the spool housing 122 may be rotated to reel-in any excess slack in the first predetermined sheet portion of membrane material 118a for which the first predetermined sheet portion of membrane material 118a may now serve as a barrier for protecting the equipment 112 against predetermined storming condition.

In addition, the first predetermined sheet portion of membrane material 118a includes a first adjacent edge 118a' (e.g. front edge) that is adapted for coupling to a top edge region 118b' of the second portion of flexible membrane material 118b in a similar manner as shown and described above in detail with respect to FIG. 6. The second portion of flexible membrane material 118b also includes a number of engagement members 114d, which are each uniformly spaced and attached to the leading or bottom edge region 116b of the second portion of flexible membrane material 118b. The engagement members 114d attached to the leading or bottom edge region 116b of the second portion of flexible membrane material 118b may be each engaged to a corresponding anchoring device 114 located on the ground surface 124, as similarly described above. In this arrangement, the second portion of flexible membrane material 118b is employed to substantially enclose a front end portion of the equipment 112 (e.g., helicopter) parked or otherwise positioned on the equipment pad area 110.

Although not specifically shown, it should be understood that the first predetermined sheet portion of membrane material 118a similarly includes a second adjacent edge (e.g. rear edge) that is adapted for coupling to a top edge region of a third portion of flexible membrane material in a similar manner as shown and described above in detail with respect to FIG. 6. The third portion of flexible membrane material is similarly constructed and arranged as the second portion of flexible membrane material 118b and also includes a number of engagement members, which are each uniformly spaced and attached to a bottom edge region of the third portion of flexible membrane material. The engagement members attached to the bottom edge region of the third portion of flexible membrane material may be each engaged to a corresponding anchoring device 114 located on the ground surface 124. In this arrangement, the third portion of flexible membrane material is employed to substantially enclose a rear end portion of the equipment 112 parked or otherwise positioned on the equipment pad area 110.

Although the exemplary embodiments of the vehicle and/or equipment storm shield 12 and/or system 100 have been shown and described hereinabove in connection with a vehicle 10 (e.g., a Humm-Vee) and equipment (e.g. a helicopter), it should be understood that the storm and/or equipment shield 12 and/or system 100 can also be similarly employed to protect a plurality of other vehicles, equipment and structures from damage due to storming conditions. For example, the storm and/or equipment shield 12 and/or system 100 can be employed, as described above, to protect a plurality of other vehicles, equipment and structures from damage due to storming conditions, such as, but not limited to, trucks, trains, jets, generators, uninterruptible power supplies (UPSs), computers, electronic equipment, radar systems and the like, while at the same time being highly portable.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. An equipment storm shield, comprising:

an elongated base having a top surface and a bottom surface adapted for coupling to at least one piece of equipment;

an elongated spool support member having a bottom surface mounted on the top surface of the base and a top surface having an elongated concave surface;

an elongated spool housing mounted on the concave surface of the spool support member and including an elongated hollow interior portion accessible via an elongated opening extending along a longitudinal edge region of the spool housing;

a first spool of flexible membrane material rotatably mounted in the hollow interior portion of the spool housing and having a first longitudinal edge substantially aligned with the opening located on the spool housing, wherein the first longitudinal edge of the first spool of flexible membrane material is pulled through the opening to remove a first predetermined sheet portion of material from the first spool of flexible membrane material and wherein the first predetermined sheet portion of material is constructed and arranged as a barrier for protecting the equipment against predetermined storm conditions; and an anchoring mechanism adapted for being removably coupled to the first longitudinal edge of the first spool of flexible membrane material and for retaining the first longitudinal edge of the first spool of flexible membrane material on a ground surface located a predetermined horizontal distance from the base of the at least one piece of equipment.

2. The equipment storm shield of claim 1, wherein the base includes a compliant rubber pad adapted to substantially conform to a top surface of the at least one piece of equipment.

3. The equipment storm shield of claim 1, wherein the spool housing includes a spring loaded tension mechanism adapted to provide a predetermined spring force to the first spool of flexible membrane material to permit the first spool of flexible membrane material to retract the first predetermined sheet portion of material.

4. The equipment storm shield of claim 1, wherein the spool housing includes a hand cranking mechanism coupled to the first spool of flexible membrane material for permitting manual rotation of the hand cranking mechanism to be transposed to the first spool of flexible membrane material to permit the first spool of flexible membrane material to retract the first predetermined sheet portion of material.

5. The equipment storm shield of claim 1, wherein the spool housing includes a pivotably mounted access door that operates to seal the opening located on the spool housing when the equipment storm shield is not in use.

6. The equipment storm shield of claim 1, wherein the first spool of flexible membrane material includes at least one of nylon, canvas, plastic, natural materials, synthetic materials, knitted materials, woven materials and chemically coated materials.

7. The equipment storm shield of claim 1, wherein the anchoring mechanism includes an angle bracket.

8. The equipment storm shield of claim 7, wherein the angle bracket includes a base portion having a plurality of openings each opening being adapted to accept an anchor spike operative to securely retain the base portion of the angle bracket on the ground surface.

9. The equipment storm shield of claim 8, wherein the base portion of the angle bracket further include a releasable attachment mechanism adapted to engage and securely retain the first longitudinal edge of the first spool of flexible membrane material.

10. The equipment storm shield of claim 9, wherein the angle bracket further includes a support portion inclined at a predetermined angle from the base portion and being adapted to support the first predetermined portion of flexible membrane material at a predetermined angle.

11. The equipment storm shield of claim 10, wherein the predetermined angle includes an angle ranging from approximately 15-degrees to approximately 75-degrees.

12. The equipment storm shield of claim 1, wherein the first spool of flexible membrane material further includes a first adjacent edge adapted for coupling to a second adjacent edge of a second spool of flexible membrane material associated with a second equipment storm shield for permitting at least the first predetermined sheet portion of the first spool of flexible membrane material to be coupled to a second predetermined sheet portion of a second spool of flexible membrane material for substantially enclosing the at least one piece of equipment.

* * * * *